United States Patent
Lambert et al.

(10) Patent No.: US 7,033,495 B2
(45) Date of Patent: Apr. 25, 2006

(54) SELF CONTAINED DISSOLVED AIR FLOTATION SYSTEM

(75) Inventors: David P. Lambert, Irvine, CA (US); James J. Houtz, Irvine, CA (US)

(73) Assignee: Sionix Corporation, Irvine, CA (US)

(*) Notice: Subject to any disclaimer, the term of this patent is extended or adjusted under 35 U.S.C. 154(b) by 354 days.

(21) Appl. No.: 10/376,573

(22) Filed: Feb. 27, 2003

(65) Prior Publication Data

US 2004/0168965 A1 Sep. 2, 2004

(51) Int. Cl.
*C02F 1/24* (2006.01)
*C02F 1/52* (2006.01)
*C02F 9/02* (2006.01)
*C02F 9/04* (2006.01)

(52) U.S. Cl. .................... 210/221.2; 210/241; 210/96.1; 210/97; 210/104; 210/109; 210/202; 210/205; 210/143

(58) Field of Classification Search ............ 210/221.2, 210/221.1, 241, 96.1, 97, 104, 109, 202, 210/205, 143, 106
See application file for complete search history.

(56) References Cited

U.S. PATENT DOCUMENTS

| | | | | | |
|---|---|---|---|---|---|
| 2,793,185 A | * | 5/1957 | Albrektsson et al. | ....... | 210/703 |
| 2,994,432 A | * | 8/1961 | Schluter | ..................... | 210/101 |
| 3,313,795 A | * | 4/1967 | Ernst | ......................... | 530/419 |
| 4,100,066 A | * | 7/1978 | Bloomer et al. | ............ | 210/703 |
| 4,563,274 A | * | 1/1986 | Rothon et al. | .............. | 210/101 |
| 5,080,802 A | * | 1/1992 | Cairo et al. | ................. | 210/703 |

FOREIGN PATENT DOCUMENTS

CA 2183146 * 2/1998

* cited by examiner

*Primary Examiner*—Thomas M. Lithgow
(74) *Attorney, Agent, or Firm*—K. David Crockett, Esq.; Crockett & Crockett

(57) ABSTRACT

A dissolved air flotation system and method for purifying fresh water. The system is self-contained within a standard shipping container, with all components disposed in-line within the shipping container. Float is removed from the flotation tank with a skimmer that drives float downstream onto a conveyor belt, and the conveyor belt conveys float away from the flotation tank, in the downstream direction, and deposits the float in a collection tank. Clean water may be drawn from the flotation tank continuously, while float may be removed periodically.

4 Claims, 3 Drawing Sheets

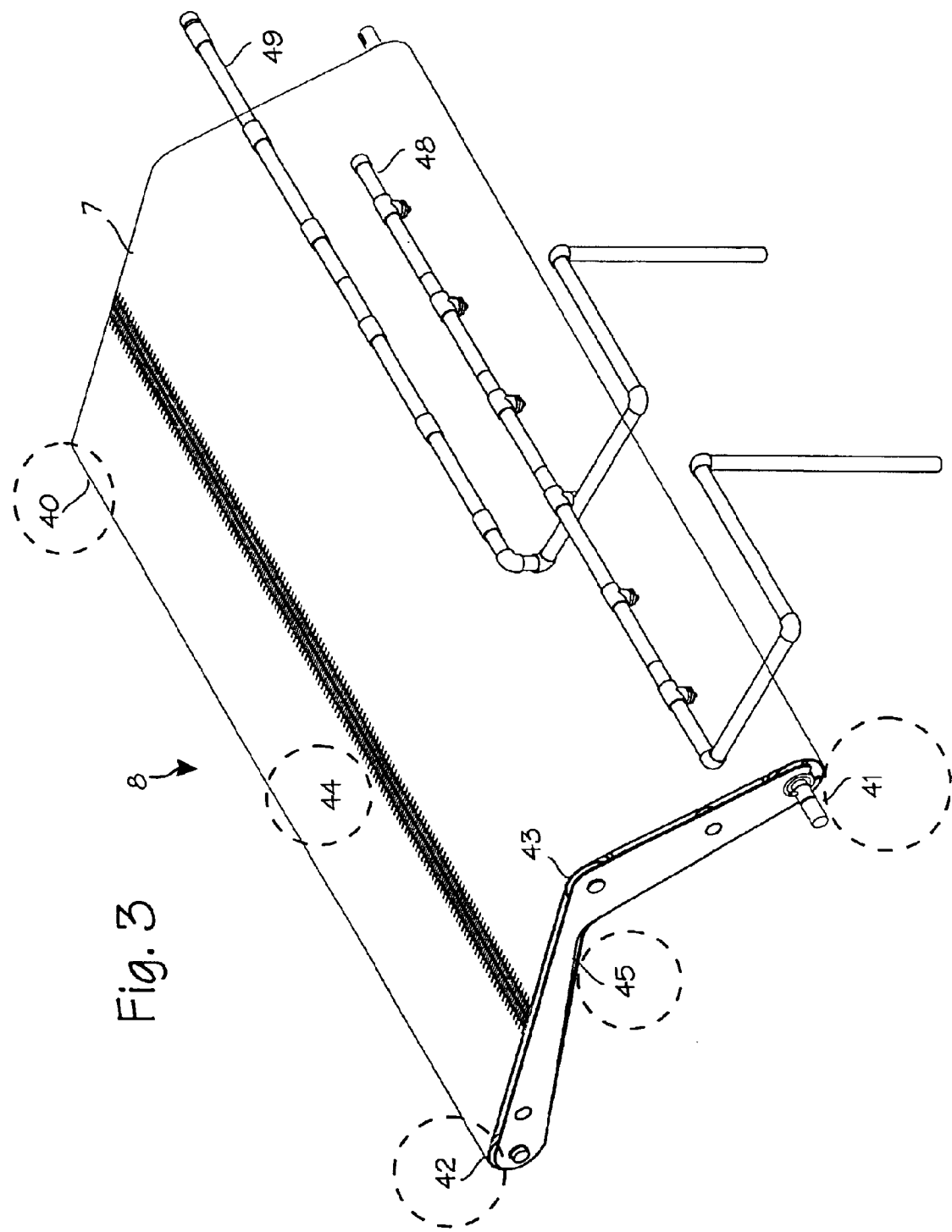

SELF CONTAINED DISSOLVED AIR FLOTATION SYSTEM

FIELD OF THE INVENTIONS

The inventions described below relate the field of dissolved air flotation.

BACKGROUND OF THE INVENTIONS

Dissolved air flotation is one of several processes used to clean and purify water. The process may be used for removing suspended solids, including organisms, from fresh water for municipal water supplies, or for removing suspended solids from industrial wastewater. In the dissolved air flotation process, influent water is mixed with a coagulant to form flocculent particles, and then white water (air-saturated high-pressure water) is injected into a tank of the influent water/flocculent mixture to form air bubbles that attach to the flocculent particles and lift them to the surface. The particles lifted to the surface accumulate in a layer of scum or sludge, referred to as the float. This layer is skimmed off the surface of the tank, while clean water is drawn out of the bottom of the tank.

For municipal water supplies, the suspended solids of concern include microbial pathogens such as cryptosporidium and giardia. Cryptosporidum and giardia are waterborne protozoan parasites that cause intestinal infections. In typical municipal purification systems, chlorine is used to kill these organisms, even after filtration and other purification methods may have removed a large portion of the influent population. This results in the formation of trihalomethanes (chloroform, dichlorobromomethane, dibromochloromethane, and bromoform) when the chlorine reacts with compounds already in the fresh water. These carcinogenic disinfection by-products are clearly undesirable. Reduction of microbial pathogens prior to chemical treatment in the water is desirable in order to minimize the creation of disinfection by-products.

Though dissolved air flotation is promising as a technique for removing microbes and other suspended solids, its use has been hampered by low volume, lack of need given lax water quality standards, and high cost of installation. These limitations are overcome by the new system describe below.

SUMMARY

The systems and methods described below provide for efficient, modular, transportable dissolved air flotation systems. The system includes a waste transport system that permits continuous operation, entails minimal loss or diversion of influent water for float removal, and provides for easy disposal of waste materials in the float.

The dissolved air flotation system described below removes 99.99% of particles in the size range of 1 to 10 microns. This represents a 4 to 5 log removal rate. Particles in the 1 to 10 micron size range include prevalent fresh water contaminants such as cryptosporidium (3–5 microns) and giardia (5–7 microns), *escherichia coli,* and microscopic organic algae and protozoa. The clean effluent may then be treated in conventional disinfectant and filtering systems with greatly reduced load on those systems. Thus, the material requirements for these systems is lower, and the need for injection of chlorine is minimized, along with the deleterious production of toxic disinfectant by-products (voluble organic chemicals) which are the result of chlorine injection into water with high bacterial content. Thus, use of the system will minimize the risk from both microbial pathogens and disinfectant by-products simultaneously.

The system includes a flocculation tank, flotation tank, waste collecting system, filtering system, disinfecting system and control system arranged in a linear arrangement, with all the components sized and dimensioned to fit within a standard shipping container. The waste collecting system includes a skimmer that moves across the surface of the water in the flotation tank and pushes the float onto a beach. The beach is provided in the form of a conveyor belt, which conveys skimmed float away from the tank and deposits it in a collecting tank. The skimmer is driven over the surface of the water, and the conveyor belt is driven at a speed that matches or slightly exceeds the skimmer speed.

BRIEF DESCRIPTION OF THE DRAWINGS

FIG. 3 is a detailed view of the beach and waste transport system.

DETAILED DESCRIPTION OF THE INVENTIONS

Figure 1:
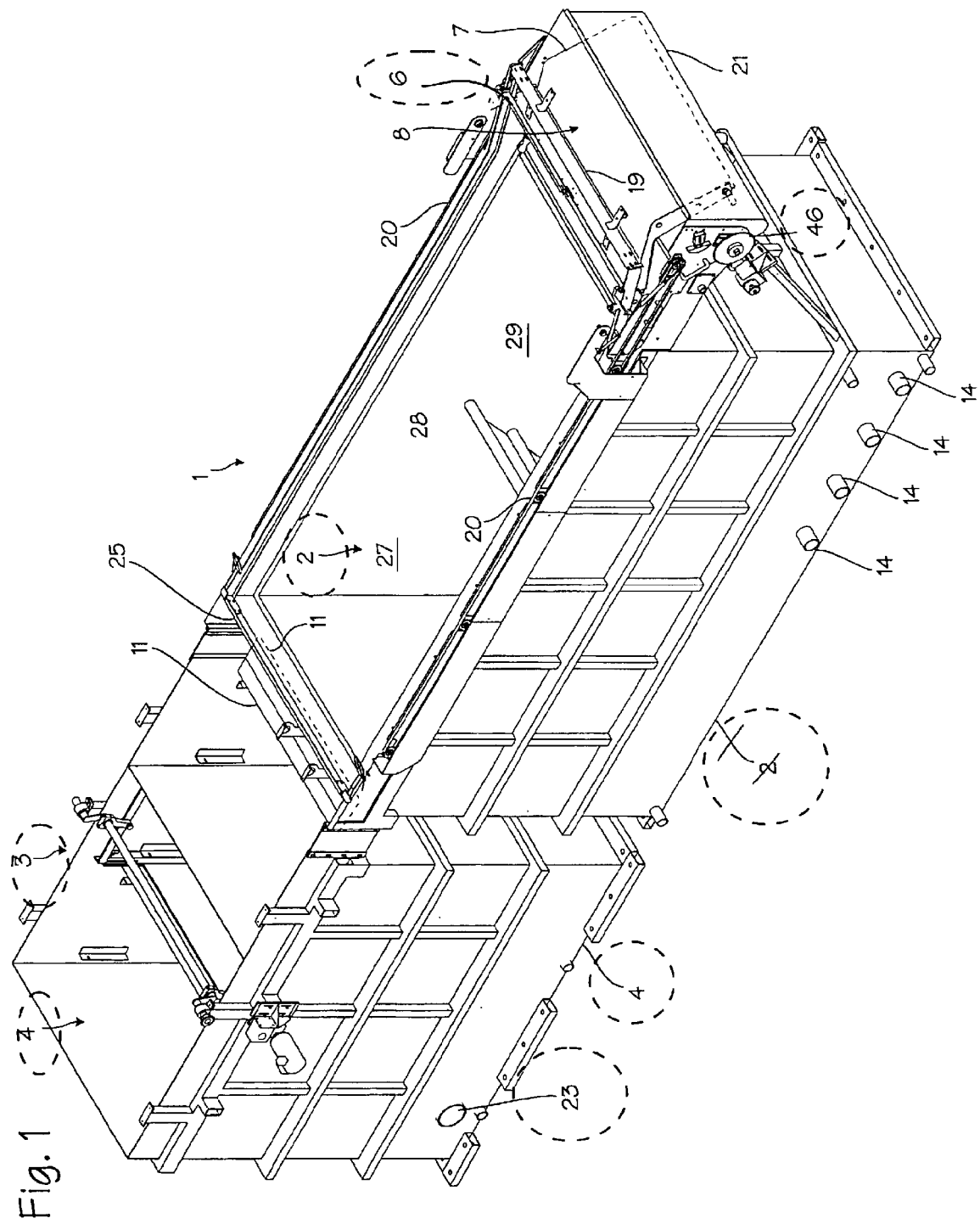
FIG. 1 illustrates the dissolved air flotation system adapted for installation in a standard shipping container.
Figure 2:
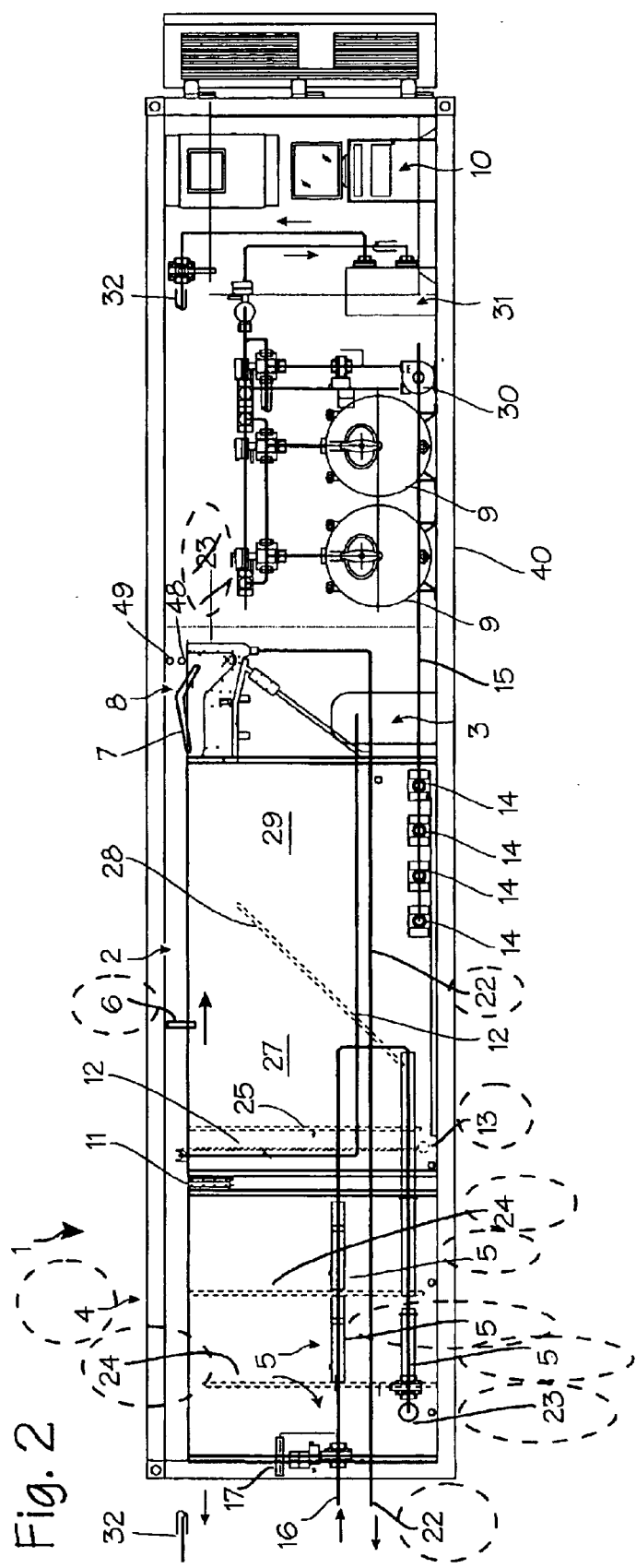
FIG. 2 shows a side view of the system.

FIGS. 1 and 2 illustrate the dissolved air flotation system 1. The major components of the dissolved air flotation system include a flotation tank 2 and a dissolved air supply 3, a flocculation tank 4 and influent/coagulant mixing system 5, a skimmer assembly 6, a waste collecting system that includes a beach 7 and waste transport system 8, post-treatment filtration tanks 9, and a control room 10.

The flotation tank 1 is used to mix influent water with a stream of water containing a large amount of dissolved air. The bubbles produced from the dissolved air attach to flocculent (particles suspended in the water which have aggregated into clumps or masses in the flocculation tank) grown in the influent water and floats to the top of the tank where it collects in a thin layer referred to as float, sludge, or scum. The flotation tank is supplied with unpurified influent from the flocculation tank, flowing over weir 11 (as influent is pumped into the flocculation tank, the flocculation tank overflows into the flotation tank), and is supplied with high dissolved air content "white water" through supply line 12 which feeds a manifold 13 of injection ports located at the bottom of the flotation tank. Clean water is removed from the flotation tank through clean water outputs 14 (in fluid communication with output manifolds disposed transversely in the lower downstream portion of the flotation tank) and clean water output line 15. The flotation tank measures about 5 feet wide, 12 long, and 7 feet deep, and holds about 3000 gallons when full.

The flocculation tank 2 is used to combine coagulant molecules or particles with impurities in the influent water. The flocculation tank is supplied with influent fresh water which has been mixed with coagulant and, optionally, conditioning chemicals used to adjust water chemistry to enhance flocculation. Influent fresh water is injected into the flocculation tank through influent supply line 16 at the lower corner. The influent water thereafter flows through a tortuous pathway through the tank (the tortuous pathway is created by baffles disposed within the tank), until it overflows over the dam or weir 11 into the flotation tank, so as to provide adequate dwell time for the flocculation of the coagulant and impurities in the influent water. The weir serves to limit the flow of water from the flocculation tank to the flotation tank, until the water level in the flocculation tank exceed the height of the weir. The weir may be formed from the downstream wall of the flocculation tank, and, correspondingly, the upstream wall of the flotation tank. Prior to injection, influent/coagulant mixing system 5 draws and mixes a small amount of coagulant into the influent stream (coagulant concentration of 1–100 ppm is sufficient). The coagulant is stored in a small tank 17, and is mixed. The flocculation tank measures about 5 feet wide, 9 feet long, and 7 feet deep, and holds about 1800 gallons when full.

The float is removed by the skimmer assembly 6. The skimmer assembly comprises a flight 19 which is driven across the surface of the water in the flotation tank by a flight drive mechanism 20. The flight extends transversely across the flotation tank, and preferably extends from sidewall to sidewall with little or no clearance. Conformable wipers or seals may be applied to the transverse ends of the skimmer to contact and wipe the sidewalls during skimmer translation to prevent retrograde flow of float. The flight may also be referred to as a skimmer. The drive mechanism may be a chain drive, worm gear, or any other suitable drive mechanism. Prior to movement of the flight, flow into and out of the system is adjusted to allow the flotation tank water level to rise above the level of the downstream wall of the flotation tank. The flight is moved slowly, at about 1.5 feet per minute (about 0.5 meters per minute) to push the float toward the downstream end of the flotation tank without causing significant turbulence in the flotation tank. The float is pushed over the end wall, and out of the tank. After the flight has skimmed the entire length of the flotation tank, it is driven further past the end of the tank, and is raised or tilted upward and washed. Also, the tank level is drawn down, below the level of the end wall. After washing, the flight is drawn back to the upstream end of the tank, where it is stored in anticipation of the next pass. During the skimmer pass, the water inflow, white water injection, and output continue.

The skimmer pushes the float over the end wall of the flotation tank. The float is pushed onto the beach 7 and waste transport system 8. The beach is provided in the form of a rolling conveyor belt. The belt continuously travels away from the flotation tank, and transports deposited float away from the tank. The float falls off the belt as the belt turns under rollers during its travel, and falls into a waste collector pan 21. The beach is rolled at a speed matching, or slightly exceeding, the horizontal speed of the flight. For example, belt speed may be 1.5 feet per minute to 2 feet per minute, and should be no less than 100% of belt speed, and is preferably about 105% to 120% of skimmer speed. By slightly exceeding the flight speed, the float is removed at a rate that prevents build-up on the belt (and potential retrograde flow back over the end wall into the flotation tank), while also avoiding turbulence in the flow. Float in the waste collector pan flows through waste line 22 to storage tanks or other systems for processing. The wastewater can be very fluid, though it contains up to 10% solids. Depending on the contaminants in the effluent water and the coagulant used, the solid waste can be processed for other uses, such as fertilizer or fuel. (It is expected that sediment will be minimal when the system is used to purify fresh water supply to municipal water systems, so that the bottom of the tank need not be wiped regularly, but may be vacuumed yearly or quarterly.)

FIG. 2 shows a side view of the system. In this view, the internal parts of the flocculation tank and flotation tank are more clearly illustrated. In the flocculation tank, the influent inlet 23 is positioned at the bottom of the tank, and the upstream end of the tank. Several baffles 24 are positioned to create the tortuous pathway desired to increase dwell time and encourage flocculation (the agglomeration of coagulant molecules and suspended solids). In the inlet piping, a coagulant supply tank and appropriate piping provided coagulant to the influent stream, and this is thoroughly mixed in the influent/coagulant mixing system 5. After mixing and flocculation in the flocculation tank, the flocculent-containing water flows over weir 11 into the flotation tank. The flotation tank contains an inflow baffle 25, which directs inflowing water downwardly, toward the aerated water (white water) inlet manifold 13. The mixed white water and flocculated influent flow upwardly through the bubble contact zone 27 established by the baffles 25 and 28, and then into the flotation zone 29. In the bubble zone, the dissolved air in the white water comes out of solution and forms micro-bubbles, and these micro-bubbles attach to the flocculent particles to form buoyant agglomerations of bubbles and flocculent particles. In the flotation zone, the bubble/flocculent agglomerations float to the surface of the water in the tank, and remain floating on the surface until skimmed from the tank by the flight. Clean water is removed from the bottom of the flotation tank. A small portion of the clean water may be diverted to the white water system, to be aerated and injected back into the flotation tank. The remainder of the clean water is pumped by pump 30 to filter tanks 9 and thereafter to disinfection system 31, after which it is considered potable water, and thereafter through potable water output line 32 into the municipal water supply or potable water supply. The filters may comprise filter tanks may comprise micro-filtration systems ultra-filtration systems, and the disinfection system may comprises an ultraviolet disinfection system or a chlorine injection system. The load on the disinfection system and filter tanks is greatly reduced by the removal of almost all the suspended solids in the influent water. The operation of the system, including monitoring of water chemistry, pump performance and flow measurements, periodic over-filling of the flotation tanks, and periodic translation of the flight, may be controlled from control mechanisms housed in the control room 10. The system is preferably automated and controlled by computer, and/or requiring only routine monitoring by system operators and technicians.

All of the components are adapted for installation in a standard shipping container 40. The standard shipping container is preferably adapted for transport on rail cars, trucking platforms and container ships. The container is, thus, a standard size of 40 feet long, 8 feet wide, and 8 feet tall to match standard-sized shipping containers in use in the United States (the dimensions may be varied slightly while still maintaining the preferred compatibility with various trucking, rail, and shipping standards, and still be considered standard size). The shipping container is modified with the addition of closures necessary for access to the various subsystems of the purification system. The size may be adjusted to meet differing regional standards. All the components of the system fit within the container, so that the installation site need only supply electrical power and influent water, and replenishment of the consumables used in the process. Providing the system in the container allows the systems to be built in a central location, and thereafter be transported to any site for use. Multiple systems may be ganged together to meet any need, and thus may be purchased as needed by municipal water suppliers to meet the needs of growing communities. The systems may be shipped anywhere, and thus may be provided to remote locations quickly.

FIG. 3 is a detailed view of the beach and waste transport system. The beach comprises a continuous belt 40, disposed over drive spool 41 and spindles 42 and 43. The float receiving surface 44 of the belt is preferably inclined upwardly, from upstream to downstream, at a slight angle of about 7 degrees. The drive spool and spindles are held in fixed relationship of each other by frame 45 on either side of the belt. The frames are boomerang shaped or L-shaped, so that they hold the three shafts in triangular relationship to each other, and is mounted, as shown in FIG. 1, to hold the beach surface (the upstream upper surface of the belt) is proximate the downstream wall of the flotation tank so that float pushed from the tank is deposited on this surface, and also to hold the beach surface at a slight upward incline (from upstream to downstream). The drive spool may be driven by a chain, through drive gear 46 shown in FIG. 1. The relative sizes of the drive gear and drive spool, and the flight drive gear, are chosen such that the belt travels, as mentioned above, slightly faster than the flight. The drive mechanisms may of course be provided in the form of a worm gear or gears operably connected to the beach drive spool and the flight, or individual motors directly driving the beach drive spool and the flight. The conveyor belt may be provided in other forms, for example moving traversely to a collection tank mounted, but the downstream direction is preferred.

At the downstream end of the belt, a manifold of spray nozzles 49 is provided to wash the belt continuously as it rolls to remove any float that has not fallen from the belt. A second manifold of spray nozzles 48 is provided to wash the flight after each pass. The belt is fabricated from fabric such as woven polypropylene or PVC fabric (with laminated borders), or other suitable material, and is preferably water permeable, so that wastewater can filter through the belt during transport (so that the belt acts as a filter belt). The belt may be provided in a disposable roll of material that is spooled from a large roll, over the spindles, and thereafter onto a collector spindle, but the continuous belt is expected to last for months in full capacity operation.

Operation of the system is preferably controlled by a computer control system in the control room. Inflow rates and tank levels are controlled by the computer system, through the control of various pumps and valves throughout the system. Control may be accomplished by providing pump 30 in the form of a variable speed pump, with appropriate control means in the control system, by providing appropriate throttle valves in the input and output lines, or other suitable means. The growth of the float may be sensed by sensors in or near the flotation tank, and these sensors are operably connected to the computer control system to provide signals corresponding to float thickness to the control system. The computer control system is programmed to receive and interpret input from the sensors, and is also programmed to operate various subsystems to overfill the flotation tank, drive the skimmer across the tank, and operate the conveyor belt when information from the sensors indicates that the float thickness is of a predetermined thickness. In a simpler embodiment, the skimmer movement may performed at predetermined time intervals or upon predetermined chemical (coagulant or other chemicals) consumption. The length of time between skims, or the amount of chemical consumption between skims, will vary depending on the type and concentration of suspended solids in the influent water. Time intervals are measured by the control system clock, and chemical consumption can be monitored by flow sensors or tank level sensors provided in the tanks used to hold the chemicals. These sensors are operably connected to the computer control system to provide signals corresponding signals, and may be used by the control system to operate various subsystems to overfill the flotation tank, drive the skimmer across the tank, and operate the conveyor belt when information from the clock or sensors indicates that the predetermined conditions for skimming the flotation tank have been met. The control system also controls the lifting of the skimmer at the end of a skim and operation of one spray manifold to clean the skimmer, and controls operation of the other spray manifold to clean the downstream portion of the conveyor belt while it is moving. The control system also receives, monitors, and report various measured parameters of the system, such as fluid flow and pressure, turbidity and temperature, tank levels, etc.

When constructed and operated as described above, the system provides potable water at a rate of about 200 gallons per minute, or 288,000 gallons per day. This would supply potable water for about 600 households in the United States.

While the inventive systems and methods have been described in relation to dissolved air flotation, it may be used for rudimentary air flotation systems (similar systems using macroscopic bubbles in the flotation tank) as well. Also, although described in relation to purifying fresh water influent for use in municipal water supplies, the beneficial aspects of the system may be employed in wastewater systems for a variety of industries. Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

We claim:

1. A self-contained dissolved air flotation system for purifying influent water, said system comprising:
   a flocculation tank;
   a flotation tank having an upstream end and a downstream end;
   an influent water supply port in fluid communication with the flocculation tank and a flocculation tank output communicating downstream to the upstream end of the flotation tank;
   a skimmer disposed above the flotation tank, said skimmer extending transversely across the flotation tank;
   means for driving the skimmer from the upstream end of the flotation tank to the downstream end of the flotation tank, thereby pushing float out of the downstream end the flotation tank;
   a float collection tank disposed downstream of the flotation tank, in position to receive float from the downstream end of the flotation tank;
   an output manifold disposed in the lower portion of the downstream end of the flotation tank for drawing clean water from the flotation tank;
   a standard shipping container, wherein the flocculation tank, flotation tank, and float collection tank are positioned in-line along the length of the shipping container; and
   a control system operable to operate the skimmer to translate along the length of the flotation tank and correspondingly operate a conveyor belt to convey float deposited thereon into the float collection tank at predetermined intervals.

2. A self-contained dissolved air flotation system for purifying influent water, said system comprising:

a flocculation tank;

a flotation tank having an upstream end and a downstream end;

an influent water supply port in fluid communication with the flocculation tank and a flocculation tank output communicating downstream to the upstream end of the flotation tank;

a skimmer disposed above the flotation tank said skimmer extending transversely across the flotation tank;

means for driving the skimmer from the upstream end of the flotation tank to the downstream end of the flotation tank, thereby pushing float out of the downstream end the flotation tank;

a float collection tank disposed downstream of the flotation tank, in position to receive float from the downstream end of the flotation tank;

an output manifold disposed in the lower portion of the downstream end of the flotation tank for drawing clean water from the flotation tank;

a standard shipping container, wherein the flocculation tank, flotation tank, and float collection tank are positioned in-line along the length of the shipping container;

means for storing coagulant and injecting coagulant into the influent water;

sensors for sensing the amount of coagulant injected into the influent water and producing a signal corresponding to flocculent consumption; and a control system operable to receive and interpret the signal corresponding to coagulant consumption, said control system programmed to determine when coagulant consumption reaches a predetermined amount, and thereupon operate the skimmer to translate along the length of the flotation tank and correspondingly operate a conveyor belt to convey float deposited thereon into the float collection tank.

3. The system of claim 1 further comprising:

a sensor for sensing the thickness of a float accumulated on the surface of the water in the flotation tank, said sensor being operable to produce a signal corresponding to float thickness;

wherein the a control system is further operable to receive and interpret the signal corresponding to float thickness, said control system is further programmed to determine when float thickness reaches a predetermined thickness, and thereupon operate the skimmer to translate along the length of the flotation tank and correspondingly operate the conveyor belt to convey float deposited thereon into the float collection tank.

4. The system of claim 1, 2 or 3 further comprising:

a spray manifold for spraying the downstream end of the conveyor belt, said manifold being disposed proximate the downstream end of the conveyor belt;

wherein the control system is programmed to operate the spray manifold to clean the skimmer when the skimmer is disposed proximate the downstream end of the flotation tank.

\* \* \* \* \*